2,668,803

UNITED STATES PATENT OFFICE 2,668,803

MANUFACTURE OF POLYVINYL AROMATIC ACETALS AND PIGMENTS THEREFROM

Louis Amédée Lantz and Arthur Schofield, Manchester, England, assignors to The Calico Printers' Association Limited, Manchester, England, a British company No Drawing. Application September 18, 1950, Serial No. 185,504

Claims priority, application Great Britain May 13, 1944

14 Claims. (Cl. 260—41)

This invention relates to manufacture of polyvinyl aromatic acetals and pigments therefrom; and it comprises a process wherein an aqueous solution of a polyvinyl alcohol or derivative thereof, having a concentration ranging from about 1 to 20 per cent by weight, is condensed at temperatures within the range of about 1° to 80° C., with at least one aldehyde of the benzene and naphthalene series, said aldehyde being in highly dispersed form, in the presence of an acetalizing catalyst and in proportions producing a water-insoluble condensation product, thereby producing in situ a precipitate of an aromatic acetal of said polyvinyl alcohol in extremely finely-divided form capable of being dyed directly in light-fast bright colors; all as more fully hereinafter set forth and as claimed.

The present application is a continuation-in-part of our copending application, Serial Number 592,918, filed May 9, 1945, now abandoned. This prior application discloses the same procedures for making the polyvinyl aromatic acetals and corresponding pigments which are herein described and claimed, but more generally. In the present application our processes are described more specifically and with additional examples and the limits of our invention are more closely defined.

Various processes have been proposed in the art for making polyvinyl acetals. In these processes polyvinyl alcohols have been condensed with various aldehydes, usually in the presence of an organic solvent, the solutions of polyvinyl acetals thus formed being usually precipitated by the addition of water or other non-solvent in order to recover the polyvinyl acetals. In these procedures a considerable amount of difficulty has been encountered owing to the tendency of the polyvinyl acetals to be precipitated in the form of lumps or coarse particles which are incapable of being ground to a fine powder, owing to their thermoplastic properties. Moreover these particles have the tendency to agglomerate during drying or storage. It is also true that these precipitated polyvinyl acetals contain residues of solvent, acid catalyst and other impurities which are difficult to remove. These impurities have rendered unstable many products formed from these acetals. It has also been proposed to condense polyvinyl alcohols with aldehydes in the presence of a minimum quantity of water but here again difficulties have arisen from the tendency of the condensate to form lumps and a separate precipitation step has been required.

We have discovered what we believe to be the first practical one-step method of preparing polyvinyl acetals of any type directly in the form of very fine particles without the necessity of a subsequent precipitation step. We also appear to be the first to have discovered a method of producing polyvinyl aromatic acetals in the form of substantially uniform fine particles whose average size is as low as 4 microns or below. More specifically we believe that we are the first to have described a method of preparing polyvinyl acetals, containing acetal groups derived from aldehydes of the benzene and naphthalene series, in which the polyvinyl acetals are precipitated in the form of extremely fine particles as fast as they are formed and without the necessity for any subsequent precipitation step. The precipitated products thus obtained are highly pure, stable, free from acid residues and, unexpectedly, they can be dyed directly in extremely bright and fast colors. Aliphatic polyvinyl acetals cannot be dyed in this manner since they have poor affinity for dyestuffs and their particles would coalesce if dyed warm.

The dyed particles produced in our process are so finely divided, having a maximum particle size not exceeding 20 microns and an average particle size usually within the limits of 1.5 and 4 microns, and are so brilliantly dyed that they can be used directly as pigments for incorporation into paints, varnishes, printing compositions, coating media, plastics and the like. It is also possible to utilize the dyed particles directly as molding powders since they can be molded under the application of heat and pressure. Our discoveries thus make it possible for the first time to produce brilliantly colored and stable organic pigments which cover the entire color range, all having the same brightness and fastness toward light and all on the same substratum. These products are truly pigments and molding powders in one and give products of perfect evenness and extreme brightness of colors.

Our process of producing these products is both simple and practical. A dilute aqueous solution containing from about 1 to 20 per cent by weight of a polyvinyl alcohol is first prepared. The polyvinyl alcohol in this solution is then condensed with an aldehyde of the benzene and naphthalene series which is in a highly-dispersed state in the presence of an acetalizing catalyst and at a temperature within the range of from about 1° to 80° C. usually under conditions of agitation, followed by recovery of the finely-divided acetal which is thereby precipitated.

The aqueous polyvinyl alcohol solution used in this process must have a low viscosity and, in the case of high-viscosity alcohols, the maximum concentration which can be used is about 10 per cent by weight. Low-viscosity commercial products are available, however, which can be used in concentrations as high as 20 per cent by weight. The alcohol used can be of the so-called "partial" type.

Partial polyvinyl alcohols are produced by partial hydrolysis of polyvinyl esters and contain residual ester groups, usually acetyl groups. During the hydrolysis reaction the products become gradually more soluble in water as the ester groups are replaced by hydroxyl groups. We have found that the hydrolysis must be continued until at least about 80 per cent of the original ester groups have been replaced with hydroxyl groups. In other words the polyvinyl alcohols which are suitable for use in our process must contain no more than about 20 per cent of residual ester groups. The alcohols must also be water soluble, at temperatures within the range indicated above, in the amount of at least about one per cent by weight. The polyvinyl alcohol may also contain aliphatic acetal groups in lieu of or in addition to ester groups. These aliphatic acetal groups may be derived, for example, by partial acetalization of a polyvinyl alcohol or of a "partial" polyvinyl alcohol, using an aliphatic aldehyde. It is also possible to acetalize a polyvinyl alcohol more or less completely and then partially hydrolyze the product to obtain a partial polyvinyl acetal or ester-acetal, containing free hydroxyl groups. Pure polyvinyl alcohols can be used in our process but the commercial product, which usually contains up to 5 per cent of residual ester groups, is just as satisfactory and much cheaper.

We have found that in order for partial polyvinyl acetals or acetal-esters to be useful in our process they must contain at least about 35 per cent of free hydroxyl groups, that is 35 per cent of the hydroxyl groups which would theoretically be present in the unsubstituted alcohol. Moreover we have found that no more than about 20 per cent of the hydroxyl groups of the unsubstituted polyvinyl alcohol can be esterified and no more than about 50 per cent can be acetalized with aliphatic acetal groups. These figures apply particularly to low molecular aliphatic ester and acetal groups.

The aromatic aldehydes used in the condensation step of our process can be of widely different type. Any aryl or aralkyl aldehyde is operative and these aldehydes may be substituted, the only restrictions being that the aldehyde is stable under the conditions of the reaction, that the aldehyde group is the chief function or the group which is preferentially reactive with alcohol groups of the polyvinyl alcohol, and that they be free or substantially free from hydrophillic groups, such as hydroxyl, sulfonic, carboxyl and amino so they will be insoluble in water. Among the more useful of these aldehydes there may be mentioned benzaldehyde, substitution products thereof, such as halo-benzaldehydes, such as chloro-benzaldehydes and fluoro-benzaldehydes; homologues, such as tolualdehydes; nitrobenzaldehydes, alkoxybenzaldehydes, naphthaldehydes and the corresponding substitution products of naphthaldehydes.

The following specific aldehydes, aside from benzaldehyde, have been tested by us and found satisfactory:

(a) Homologues: p-tolualdehyde.

(b) Halogen derivatives: o-, m- and p-mono-chlorobenzaldehydes; o- and p-monofluoro-benzaldehydes; 2.4-, 2.5- and 2.6-dichloro-benzaldehydes; 2.4.5-trichlorobenzaldehyde.

(c) Nitro-derivatives: m-nitro-benzaldehyde; p-nitro-benzaldehyde (in mixture with benzaldehyde).

(d) Alkoxy-derivatives: o- and p-methoxy-benzaldehydes; o-ethoxy-benzaldehyde.

e) Aldehyde group in side chain: phenyl acetaldehyde, cinnamic aldehyde.

(f) Naphthalene derivatives: 2-naphthaldehyde, 1-naphthaldehyde and 5-bromo-1-naphthaldehyde.

The aliphatic acetal groups in our polyvinyl aromatic acetals can be derived from such diverse aldehydes as formaldehyde, butyraldehyde and stearaldehyde. These groups are of relatively minor importance as compared to the aromatic acetal groups. Any aliphatic aldehyde in which the aldehyde groups is the chief function can be used to supply these aliphatic acetal groups.

As indicated previously the condensation step of our process should be conducted at temperatures not substantially above 80° C. and, of course, many of the aromatic aldehydes falling within the above definition are solids at these temperatures. This necessitates the use of some method of dispersing these solids in the aqueous polyvinyl alcohol. Several methods known per se are available for this purpose. One of the most advantageous is to dissolve the solid aldehyde in an inert organic solvent and then to add the resulting solution to the polyvinyl alcohol under conditions of agitation. The solvents used must be of the type in which the resulting polyvinyl aromatic acetals are insoluble since otherwise the acetals will tend to be gelatinous when formed rather than precipitating in finely-divided form. Low molecular alcohols, such as ethyl and propyl alcohols can be used as solvents, for example, since small proportions of these in the reaction medium do not interfere with the precipitation of the polyvinyl aromatic acetate. Glycerol and ethylene glycol can also be used in some cases since these do not interfere when present in the reaction medium. But this medium must be kept substantially free from organic solvents for the polyvinyl aromatic acetals.

One of the most satisfactory methods we have discovered for utilizing solid aldehydes in our process is to dissolve them in benzaldehyde or other liquid aliphatic or aromatic aldehyde and then to add the resulting solutions to the aqueous polyvinyl alcohol solution. In this way mixed polyvinyl acetals are produced. If mixed acetals are not desired it is possible to form aqueous emulsions or dispersions of the solid aldehydes by use of the so-called colloid mill, for example, and then to use these in the process. It is only necessary that the aromatic aldehyde be finely dispersed in the reaction medium and any method of accomplishing this result can be used.

Any acetalizing catalyst can be used to produce the desired condensation between the aromatic aldehyde and polyvinyl alcohol. Many of these are known and it is within the skill of the art to select one which is suitable. Among those which have been found particularly suitable are strong acids, such as hydrochloric, sulfuric, phosphoric, oxalic, tartaric, chloroacetic, lactic, benzene sulfonic and naphthalene sulfonic acids. Any acid or acid salt which is capable of producing acidities within the pH range of from about 1.5 to 2.6 is satisfactory. Other known acetalizing catalysts, such as calcium chloride, zinc chloride, ferric chloride and boron trifluoride are operative.

The conditions under which the condensation reaction is conducted may be varied. As indicated previously the best temperature range is from about 1° to 80° C. but any temperature above the freezing point of the reaction mixture and at least about 20° C. below the softening points of the reaction products can be utilized. Temperatures should be avoided which cause the aldehyde to become appreciably soluble in the reaction mixture. Conditions should be selected such that the polyvinyl aromatic acetal formed in the process is so highly insoluble in the reaction medium that it will precipitate as fast as it is formed in the form of extremely fine particles. Agitation promotes this result and for that reason is advantageous. We usually employ a stirrer in the reaction zone rotating between 250 and 1200 R. P. M.

The time of the reaction is not critical. It is merely necessary to continue the reaction until it is substantially complete. This usually requires from about 1 to 4 hours, depending upon the acidity of the reaction medium, the concentrations of reactants, the temperature employed and the particular reactants. These factors are largely interdependent and it is possible to obtain equally satisfactory results using different sets of conditions. For example it is possible to prepare substantially identical products by carrying out the reaction at 60° C. for one hour at a pH of 2.6, or at 30° C. for 4 hours at a pH of 1.63 or at 1° C. for 4 hours at a pH of 0.76, the proportions of aromatic aldehyde to polyvinyl alcohol remaining the same in all cases.

It is usually advantageous to have a compatible emulsifying agent present in the reaction zone in order to assist in keeping the aldehyde in finely divided form. Any emulsifying agent can be employed which is stable under the conditions of the reaction, i. e. which is stable in acid solution, and non-reactive with the reactants. A large number of surface active agents are known which meet these requirements. Most of these are of the so-called anionic type. The organic sulfonates and sulfates falling within this category when dissolved in water usually produce acid solutions and many of these are sufficiently acid to serve simultaneously as acetalizing catalysts. The so-called non-ionic surface active agents such as the polyglycol ester of cocoanut oil fatty acids or polyglycol mono-oleate, are also suitable provided that they are stable under the conditions of reaction or provided that they form reaction products during the process which have emulsifying properties. Among the other suitable surface active agents there may be mentioned sodium lauryl sulfate and sodium oleyl sulfate; alkali metal salts of sulfonated esters or amides of higher fatty acids, such as the sodium salt of the N-methyl tauride of oleic acid; or salts of sulfonated aliphatic dicarboxylic acid esters, such as the dioctyl ester of sodium sulfosuccinic acid. A long list of suitable surface active agents fulfilling the listed requirements can be found in the pamphlet entitled "Synthetic Organic Chemicals," United States Production and Sales of Surface-Active Agents, 1948, published by the U. S. Tariff Commission.

Our process can be conducted in various ways. Thus it is possible merely to add the aromatic aldehyde to the aqueous solution of polyvinyl alcohol while stirring the latter. In this case it is desirable to have a surface active agent present either in the polyvinyl alcohol solution or in the aldehyde in order to be certain that the aldehyde is emulsified as it is added. It is also possible to form an aqueous emulsion of the aldehyde and then add this to the polyvinyl alcohol, or to use the reverse procedure of adding the alcohol solution to the aldehyde emulsion. The catalyst can be added either before or after the mixing step.

By suitable changes in procedure the particle size of our polyvinyl aromatic acetals can be closely controlled. It is possible, for example, to obtain products having an average particle size of from 8 to 10 microns with none over 20 microns or in the other extreme to obtain products having an average particle size below one micron and impossible to measure by ordinary methods. Such products do not settle out of the reaction mixture but remain suspended indefinitely. The most useful products have particles between about 0.5 and 4 microns in diameter.

An unexpected result obtained in our process is that our products have particle sizes which show astonishing uniformity. Products can be obtained in which up to 90 per cent of the particles are between 1.5 and 3.5 microns, none exceeding 4.5 microns. The frequency distribution of particle size for one of our products showed 65 per cent having a size of 2 microns, 25 per cent having a size of 3 microns and 10 per cent having a size of 4 microns. This appears to be a new result in the art.

The polyvinyl aromatic acetal produced in our process must be insoluble in water at the temperatures used in the process and it must have a softening point at least about 20° C. below these temperatures. Further we have found that if it is desired to produce a dyed product it is essential that our acetals contain at least 20 per cent of unsubstituted hydroxyl groups, that is, 20 per cent of the groups which would theoretically be present in the unsubstituted alcohol. For certain dyestuffs it is necessary that the free hydroxyl groups of our substantially pure aromatic products be within the range of from 40 to 60 per cent and our best colored products are obtained within this range. However satisfactory results can be obtained when up to 70 per cent hydroxyl groups are present provided that the remainder are substantially all aromatic acetal groups. These proportions are varied somewhat when part of the theoretical hydroxyl groups of the polyvinyl alcohol are substituted with ester groups and/or aliphatic acetal groups. But we have found that our products must contain at least about 15 per cent aromatic acetal groups in order that the products be insoluble in water. These relationships are collected in the following table for products capable of being dyed.

*Permissible percentages of substituent groups present in polyvinyl aromatic acetals*

| Ester Groups | Aromatic Acetal | Aliphatic Acetal | Total Acetal | Free Hydroxyl |
|---|---|---|---|---|
| Percent | Percent | Percent | Percent | Percent |
| 0-5 | 30-70 | 0 | 30-70 | 65-25 |
| 20 | 20-60 | 0 | 20-60 | 60-20 |
| 0-5 | 20-70 | 50-5 | 75-25 | 70-20 |
| 20 | 15-60 | 30-5 | 60-20 | 60-20 |

It is evident from the above table that in our process the ratio between the aromatic aldehyde and the polyvinyl alcohol used in the process must be controlled so that from 15 to 70 per cent of the hydroxyl groups are replaced by aromatic acetal groups while at least 20 per cent of the hydroxyl groups must remain free. This means that the original polyvinyl alcohol must contain at least 35 per cent of free hydroxyl groups. The proportions of aromatic aldehyde to polyvinyl alcohol required to produce the products whose compositions are represented in the above table cannot be set out in any simple manner. It is, however, a simple matter of experiment to determine the proper proportions to be employed to produce a product of any given analysis within the above table with a given polyvinyl alcohol or partial polyvinyl alcohol, a given aldehyde, and under given reaction conditions. The required proportions can be estimated rather closely from the specific examples which follow. A rough estimate can be gained from the facts that, with a polyvinyl alcohol in which about 95 per cent of the hydroxyl groups are free a molecular ratio of aromatic aldehyde to polyvinyl alcohol of 0.25 to 1 leads to the replacement of about 40 per cent of the available hydroxyl groups by aromatic acetal groups. If a molecular ratio of aromatic aldehyde to polyvinyl alcohol of 0.5 to 1 is used, the replacement will be about 60 per cent, while if the molecular ratio is 0.7 to 1 the replacement will be about 70 per cent. Molecular ratios as high as 0.8 to 1 can be used in some cases. With partial polyvinyl alcohols in which a substantial proportion of the hydroxyl groups is already substituted by ester and/or aliphatic acetal groups, smaller proportions of aromatic aldehyde are required to form insoluble products having the desired properties. Molecular ratios as low as 0.1 to 1 have been used satisfactorily in such cases. So the over all ratios range from about 0.8 to 1 to 0.1 to 1. To produce products which can be dyed economically it is necessary to use ratios producing water-insoluble polyvinyl aromatic acetals having compositions within the limits set out in the above table. If products are desired which need not be dyed an excess of substitution by aromatic aldehyde over the proportions stated is permissible and products can be obtained which contain substantially no free hydroxyl groups.

Our acetals do not have sharp melting points. When heated in the dry state they slowly sinter and agglomerate at temperatures ranging from about 100° to 135° C. This softening is very gradual and somewhat variable from sample to sample so that it is difficult to set a definite softening temperature or range from a given product. The compositions of our acetals within the ranges set out do not have a great effect upon the softening ranges. Likewise products obtained from different aromatic aldehydes do not possess significantly different softening ranges.

Our finely divided acetals are insoluble in water, ether, petroleum fractions and cyclic hydrocarbons, such as decahydronaphthalene, benzene, toluene and xylene. They are insoluble or slightly soluble in aliphatic alcohols such as methyl, ethyl, n-butyl, and n-amyl alcohols; in aliphatic ketones, such as acetone, methyl-ethyl-ketone, and methyl-isobutyl ketone; in aliphatic esters, such as ethyl acetate, n-butyl acetate, and ethyl lactate; in chlorinated hydrocarbons, such as trichlorethylene, tetrachlorethane and monochloro-benzene. They are freely soluble in a limited number of solvents belonging to different chemical groups, such as benzyl alcohol, tetrahydrofurfuryl alcohol, dioxane, m-cresol and aromatic and hydroaromatic amines, such as aniline, m-toluidine, p-xylidine and cyclohexylamine.

Mixtures of compounds which individually do not dissolve our acetals are in some cases good solvents, e. g. methyl cyclohexanol and benzene or trichlorethylene and ethyl alcohol.

With increasing replacement of the hydroxyl groups by acetal groups there is a tendency towards greater solubility in organic solvents which becomes particularly marked when approaching 70% replacement.

As indicated previously our polyvinyl aromatic acetals can be dyed satisfactorily with a large range of dyestuffs. By means of an extensive series of tests we have established the fact that our polyvinyl aromatic acetals possess a high affinity for all dyestuffs which are characterised by the presence therein of at least one hydrophillic group selected from the class consisting of amino groups, phenolic hydroxyl groups and enolic hydroxyl groups and by having a solubility in water within the range of from about 0.01 to 1.5 per cent by weight. The amino groups in the dyestuff may be substituted, for example by methyl, ethyl and phenyl groups. We have discovered that dyestuffs of greater solubility than that stated have a reduced affinity for our aromatic acetals, which accounts for the solubility limitation. It is possible to have present in the dyestuff molecule water-solubilizing groups of an acid character, such as —COOH and —SO₂OH, provided that these groups do not increase the solubility of the dyestuffs above the limit stated. Other inert substituent groups which do not take part in the reaction can also be present in the dyestuff.

We have made the surprising discovery that our polyvinyl aromatic acetals can be dyed with what are known as basic dyestuffs to produce colors which are not only extremely bright but which also have surprising fastness to light. It is well known, of course, that these dyestuffs as ordinarily applied to fabrics with the aid of tannic acid are extremely bright in shade but that with few exceptions they are fugitive to light. Pigments which are fast to light have been prepared previously by precipitating these dyes with phospho-tungstic, phospho-molybdic or similar complex acids but in making such pigments much of the brightness of the original dyestuff is lost. We therefore believe that our present invention provides for the first time a method of obtaining pigments from basic dyestuffs which are both of maximum brightness and fastness to light. Our pigments cover the whole gamut of hues but the pinks, bluish reds, purples and violets are particularly valuable because these hues have not heretofore been represented in the desired brightness among the fast-to-light pigments available to the trade. The following basic dyestuffs have given excellent results in our tests:

Acronol Yellow T (Col. Ind. No. 815); Tannin Orange R (Col. Ind. No. 72); Rhodamine B (Col. Ind. No. 749); Magenta (Col. Ind. No. 677); Astraphloxine FF (Rowe, Inst. of Chem. Lectures, 1938, p. 56); Cresyl Blue BBS (Col. Ind. No. 877); Brilliant Green Y (Col. Ind. No. 662).

These dyestuffs are dissolved or suspended in water, the polyvinyl acetal is added, and the mixture is kept stirred with or without heating, until the dyestuff base has been taken up. The dyed product is then washed free from unfixed dyestuff and dried. If the dyestuff is stable at a pH between 0.2 and 0.6, it may also be present at the moment of formation of the polyvinyl acetal and the dyed pigment may be obtained in one operation.

Alternatively, the dyestuff may be added to the reaction medium after the formation of the polyvinyl acetal and dyeing carried out in the same liquor, adjustment being made to the optimum pH if necessary.

Further useful pigments are obtained from dyestuffs containing one or more basic groups, but not generally known as basic dyestuffs, as for instance: p-amino-azo-benzene; 2 ethoxybenzene-azo-alpha - naphthylamine; 1:4 - diamino-anthraquinone; 1:4 dimethylamino - anthraquinone.

Examples of dyestuffs containing hydroxyl groups are: Sudan G (Col. Ind. No. 23); Alizarine Yellow R (Col. Ind. No. 40); Alizarine Bordeaux B paste (Col. Ind. No. 1045).

Examples of dyestuffs containing amino and/or hydroxyl groups and also water-solubilizing groups are: 4-sulpho-benzene-azo - $2^1$ - hydroxy-$3^1$-naphthoic acid-beta-naphthylamide; Chrysophenine G (Col. Ind. No. 365); Chlorazol Fast Red FG (Col. Ind. No. 419 suppl.); Chlorazol Fast Helio 2RK (Col. Ind. No. 319 suppl.); Solway Sky Blue BS (Col. Ind. No. 1088 suppl.); Solway Purple (Col. Ind. No. 1073).

Pigments of outstanding merit, characterized by excellent fastness to light, very good resistance to wet treatment and insolubility in common organic solvents are also obtained with dyestuffs belonging to the class known as vat dyestuffs, as described more fully and claimed in copending application, filed by the two of us jointly with Ernest Spinner, Serial No. 18,083, filed March 30, 1948, now Patent No. 2,534,136. The vat dyestuff is applied in the form of a water-soluble alkali salt of its enolic leuco-derivative, which latter possesses a high affinity for our polyvinyl acetals and after the dyeing operation, the original insoluble dyestuff is regenerated by oxidation. The present claims, of course, do not include the subject matter of the claims of this acknowledged patent.

Vat dyestuffs in their original form have occasionally been used as pigments for application to a variety of materials by means of an adhesive. When applied in such manner, they mostly yield dull colors of an intensity and brightness generally much inferior to that obtainable from the same dyestuffs when dyed on textile materials in the usual manner. Because of these defects and of the high cost of vat dyestuffs generally, their use in the form of pigments has remained very limited.

The invention of No. 2,534,136 provides a process for producing vat color pigments of a new and improved type, in which the qualities of brightness, color yield and fastness are at least equal to those possessed by the same dyestuffs when dyed on textile materials in the usual manner.

These dyestuffs comprise two main groups: (1) indigoid dyestuffs, of which indigo itself, thioindigo, and their halogen, amino, alkyl and alkoxy derivatives are the main representatives and (2) anthraquinonoid dyestuffs which are derived from anthraquinone and other polynuclear quinones, such as benzanthrone, pyranthrone, anthanthrone, dibenzanthrone and the like. Dyestuffs belonging to either of these groups, which fulfill the requirements stated previously are suitable for producing valuable pigments and molding powders according to the invention. Examples are: Anthra Yellow GC (Rowe, Inst. Chem. Lect. 1938, p. 68); Indanthrene Brilliant Orange GK (Rowe, I. C. L. p. 67); Ciba Scarlet G (Col. Ind. No. 1228); Hydron Pink FF (Rowe, I. C. L. p. 73); Durindone Red BS (Col. Ind. No. 1207); Indanthrene Brilliant Violet Delta R (Rowe, I. C. L. p. 90); Ciba Blue 2B (Col. Ind. No. 1184); Caledon Jade Green XN (Col. Ind. No. 1101); Ciba Brown G (Col. Ind. No. 1150, suppl. p. 16).

As described in copending application, Serial No. 50,252, filed April 18, 1949, very valuable pigments are also obtained by dyeing the polyvinyl acetal with coupling components suitable for the production of insoluble azo dyestuffs, which coupling components comprise a hydroxyl group attached to an unsaturated carbon-carbon linkage, i. e. the grouping

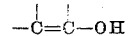

The double bond of this grouping may be part of an aromatic nucleus, such as in phenols and naphthols, or it may be part of a heterocyclic ring, or of an aliphatic chain, as in enolic compounds derived from aceto-acetic acid. All these compounds have a strong affinity for our polyvinyl acetals, and are taken up in substantial amounts from the aqueous solutions of their alkali salts. Preferred compounds are 2-naphthol and the coupling components commercially grouped under the designation of Naphthol AS, which comprises arylamides of aromatic hydroxy-carboxylic acids, such as 2-hydroxy-3-naphthoic acid, and of keto-enolic compounds having one or more groupings $R-CO-CH_2-CO-$. Examples of coupling components included in the Naphthol AS group are 2-hydroxy-3-naphthoic acid anilide (Naphthol AS), 2-hydroxy-3-naphthoic acid o-toluidine (Naphthol AS–D), 2-hydroxy-3-naphthoic acid p-anisidide (Naphthol AS–RL), 2-hydroxy-carbazole-3-carboxylic acid-p-chloranilide (Naphthol AS–LB), diacetoacetic acid-o-tolidide (Naphthol AS–S), and 2-acetoacetylamino - 6 - ethoxy - benzothiazol (Naphthol AS–L4G). Examples of phenolic compounds which yield valuable pigments are the dihydroxy-diphenylmethanes, such as 2.2'-dihydroxy-5,5'-dimethyl-diphenylmethane.

After the polyvinyl acetal has been dyed with one or more of the above compounds, it is aftertreated with an aqueous solution of a diazonium compound derived from an aromatic amine devoid of water-solubilzing substituents, whereby the insoluble azo dyestuff is formed as described and claimed in Ser. No. 50,252. Examples of suitable amines are: aniline, toluidine, benzidine, amino-azo-benzene, amino-diphenylamine, naphthylamine, amino-anthraquinone and substitution products of same such as their halogen-, cyano-, nitro-, alkoxy-, phenoxy-, halogenomethyl- and benzoylamino derivatives.

All of the above described dyestuffs and dyestuff components have the common properties mentioned above, namely they all have in their molecules at least one hydrophillic group selected from the class consisting of amino groups, phenolic hydroxyl groups and enolic hydroxyl groups and they all have a solubility in water ranging from about 0.01 to 1.5 per cent by weight. These common properties are what make these dyestuffs operative in present process which covers the use of these dyestuffs with the exception of the vat dyes of No. 2,534,136 and the azo dyes of Ser. No. 50,252.

In the dyeing of our polyvinyl aromatic acetals with vat dyes we have found that best results are obtained in the case of acetals in which the ratio of hydroxyl groups to acetal and ester groups is within the rather narrow range of from 40:60 to 60:40. These dye-stuffs are used within a temperature range at which acetals containing less than about 40 per cent acetal groups would tend to soften and agglomerate, whereas the affinity of our acetals for these dyestuffs decreases so greatly when the acetal group content exceeds 60 per cent that dyeing with these dyestuffs is no longer economical. But in the case of basic dyes and other dyes which can be used at low temperatures the affinity of the acetals for the dyestuffs is reasonably good even when the acetal groups reach from 70 to 75 per cent of those theoretically possible and, at the low temperatures which are feasible, acetals can be used which contain only about 15 to 20 per cent of the aromatic acetal groups which would be theoretically possible.

The following specific examples represent operating embodiments of our process which have been found satisfactory in actual practice.

Example 1

43 grams of polyvinyl alcohol (containing 5% unhydrolyzed acetyl groups) are dissolved in 390 mls. of water, 1.7 grams of sulphuric acid in 422 mls. of water are added, and 41 grams of benzaldehyde, previously emulsified in a solution of 2 grams sodium-dioctyl-sulpho-succinate in 98 mls. of water, is stirred in. The mixture has a pH of 1.77. It it heated to 60–70° C., and kept at this temperature for 1 hour under stirring at a speed of 1100 revolutions per minute. The resulting product is then filtered, washed with dilute ammonia to remove unreacted benzaldehyde and dried. The dry product is a white impalpable powder, whose composition is that of a partial polyvinyl benzal in which 48.5% of the hydroxyl groups remain unreacted. Its particle size does not exceed 7 microns, and is about 3 microns in 70% of the product.

If in the above preparation, 5.6 grams of sodium oleyl sulphate are used as the emulsifying agent in place of sodium di-octyl-sulpho-succinate, a similar product is obtained.

Example 2

33 grams of the same polyvinyl alcohol are dissolved in 627 mls. of water, 2 grams sulphuric acid in 141 mls. of water are added and an emulsion of 27 grams of benzaldehyde in 170 mls. of a 2% aqueous solution of sodium dioctyl-sulphosuccinate is stirred in. The mixture, which has a pH of 1.72 is further stirred for 4 hours at 30° C., at a speed of about 1000 revolutions per minute. The polyvinyl benzal which has formed is then filtered, washed with hot dilute sodium bisulphite solution and subsequently with hot water to remove unreacted benzaldehyde and dried. The product is a partial polyvinyl benzal possessing about 50% of unreacted hydroxyl groups, in which the particle size is between 1.5 and 3.5 microns in 90% of product.

If in the above preparation only 19 grams of benzaldehyde are used instead of 27 the resulting partial polyvinyl benzal possesses about 60% of unreacted hydroxyl groups. If on the contrary 38 grams of benzaldehyde are used, a product is obtained which only contains about 40% of free hydroxyl groups. In both cases, the product is similar to the preceding in fineness.

Example 3

40 grams of the same polyvinyl alcohol are dissolved in 110 mls. of water, 2 grams of oxalic acid and 12 grams of paraldehyde are added to the solution and the whole is heated under a reflux condenser to 70° C. for 1 hour and then cooled. The product consists of a partial polyvinyl alcohol soluble in cold water but insoluble in hot water, in which 5% of the hydroxyl groups have been replaced by acetal groups and 50% by ethylidene groups. The product is diluted with 771 mls. of water and 20 grams of benzaldehyde, previously emulsified in 45 grams of a 2% by weight solution of sodium dioctyl-sulpho-succinate, are added. The mixture, which has a pH of 1.68 is vigorously stirred for 2 hours at 20° C., whereby a finely divided polyvinyl benzal is obtained which is filtered off, washed with dilute ammonia and dried. Approximately 5% of the hydroxyl groups have been replaced by acetyl groups, 50% by ethylidene groups and 25% by benzylidene groups.

Example 4

50 grams of polyvinyl alcohol are dissolved in 950 mls. of water, 10 mls. of 20% by weight sulphuric acid and an emulsion of 70 grams o-chloro-benzaldehyde in 112.5 mls. of a 2% by weight solution of sodium dioctyl-sulphosuccinate are added, and the mixture is vigorously stirred for 1 hour at a temperature of 30° C. The product is filtered and washed and after drying is a fine, impalpable powder.

Example 5

If in the preceding example 85 grams of 2-naphthaldehyde are used instead of o-chlorobenzaldehyde, a similar product is obtained.

Example 6

20 grams of polyvinyl alcohol are dissolved in 2 liters of water, 25 mls. of 10% by weight sulphuric acid and an emulsion of 20 grams of benzaldehyde in 105 mls. of a 2% by weight solution of sodium dioctyl-sulphosuccinate are added, and the mixture, which has a pH of 1.63 is vigorously stirred for 4 hours at 30° C. after which the product is filtered, washed and dried. The product is a very fine white powder having an average particle size of 4 microns.

Instead of sodium dioctyl-sulpho-succinate, the same amount of the sodium salt of oleyl-methyl-taurine may be used as the emulsifying agent.

Example 7

If in the preceding example the polyvinyl alcohol is dissolved in 390 mls. of water and only 6 mls. of 10% by weight sulphuric acid are added, the resulting product is so fine that it does not settle out in the reaction mixture but remains in suspension indefinitely.

Example 8

20 grams of polyvinyl alcohol are dissolved in 354 mls. of water, a solution of 1.3 grams of oxalic acid in 26 mls. of water is added and an emulsion of 20 grams benzaldehyde in 160 mls. of a 2% by weight solution of sodium dioctyl-sulpho-succinate is stirred in. The mixture, which has a pH of 1.89, is vigorously stirred for 4 hours at 30° C., after which the product is filtered, washed and dried.

Instead of oxalic acid, 14 grams of 70% lactic acid may be used. The pH of the mixture is 1.97 in this case. The products obtained are similar to that of Example 2.

Example 9

40 grams of polyvinyl alcohol are dissolved in 695 mls. of water at 55° C. and 25 mls. of 10% by weight sulphuric acid are added. 40 grams of p-chlorobenzaldehyde is emulsified at 55° C. in 40 mls. of a 2% aqueous solution of sodium dioctyl-sulpho-succinate and added under stirring to the first solution. The mixture is then stirred at 55–60° C. for 2 hours. The resulting polyvinyl p-chlorobenzal precipitates in the form of an extremely fine powder.

If the p-chloro-benzaldehyde is replaced by 50 grams of 2,5-dichloro-benzaldehyde and the reaction is carried out for 2 hours at 70–75° C. a similar product is obtained. The 2.4- and 2.6-dichlorobenzaldehyde and 2.4.5-trichlorobenzaldehyde may also be used in equivalent amounts.

Example 10

40 grams of polyvinyl alcohol are dissolved in 727 mls. of water, 25 mls. of 10% by weight sulphuric acid and an emulsion of 48 grams of o-fluoro-benzaldehyde in 160 mls. of a 2% aqueous solution of sodium dioctyl-sulpho-succinate are added. The mixture is heated under vigorous stirring at 40° C. for 3 hours and precipitation of the polyvinyl-o-fluoro-benzal is completed by further stirring at 20° C. for 16 hours. A product of average particle size about 3 microns is obtained.

Example 11

40 grams of polyvinyl alcohol are dissolved in 1060 mls. of water and 25 mls. of 10% by weight sulphuric acid is added. 40.2 grams of p-nitrobenzaldehyde is dissolved in 10 grams of benzaldehyde by warming and the mixture is emulsified in 140 mls. of a 2% aqueous solution of sodium-dioctyl-sulpho-succinate. The emulsion is then stirred into the polyvinyl alcohol solution heated to 60° C. and the mixture is reacted at that temperature for 4 hours, yielding a finely divided product.

Example 12

The acidified polyvinyl alcohol solution of the preceding example is mixed with an emulsion of 45.5 grams of p-tolualdehyde in 140 mls. of a 2% aqueous solution of sodium dioctyl-sulpho-succinate and the mixture is reacted at 60° C. for one hour, yielding an extremely fine product.

Example 13

The tolualdehyde of the preceding example may be replaced by 51.3 grams of o- or p-methoxy-benzaldehyde with similar results.

Example 14

The tolualdehyde may also be replaced by 50 grams of either phenyl-acetaldehyde or cinnamic aldehyde but the reaction is then carried out at 30° C. for 4 hours.

Example 15

20 grams of a polyvinyl alcohol (containing 3.4% of residual acetyl groups) are dissolved in 380 mls. of water and 4 mls. of 10% by weight sulphuric acid are added. The mixture is heated to 70° C., 2 grams of paraldehyde are added under vigorous stirring and allowed to react at that temperature for 30 minutes and then cooled down to 20° C. during a further 30 minutes. 15 grams of benzaldehyde, previously emulsified in 20 mls. of a 2% aqueous solution of sodium dioctyl-sulpho-succinate are added under vigorous stirring to the still water-soluble intermediate product and are allowed to react for 4 hours at 20° C. while stirring is continued. The pH of the reaction mixture is 1.82. The partial polyvinyl benzal which has formed is then filtered and washed. The product, which contains about 20% of the hydroxyl groups replaced by ethylidene groups and 30% by benzylidene groups, is a fine, impalpable powder of average particle size of 2.6 microns.

Example 16

20 grams of a partial polyvinyl alcohol containing 20% residual acetyl groups are dissolved in 180 mls. of water, 8 mls. of 10% by weight sulphuric acid are added, and the mixture is heated to 50° C. 6.5 grams of paraldehyde are then introduced under vigorous stirring and allowed to react for 30 minutes at 50° C. and allowed to cool down to 30° C. The intermediate product is still water-soluble at that temperature. Excess acetaldehyde is then removed by bubbling air through the solution for one hour, 245 mls. of water and 11.3 mls. of 10% by weight sulphuric acid are added and 14 grams of benzaldehyde previously emulsified in 175 mls. of a 2% solution of sodium dioctyl-sulpho-succinate are stirred in and allowed to react at 30° C. for 4 hours under vigorous stirring. The pH of the reaction mixture is 1.41. The product is a fine powder and contains about 20% of the hydroxyl groups replaced by acetyl groups, 30% by ethylidene groups and 30% by benzylidene groups.

Example 17

10 grams of polyvinyl alcohol are dissolved in 230 mls. of water at 60° C. 7.5 grams of 5-bromo-1-naphthaldehyde are dissolved in 4.5 grams of benzaldehyde and the solution is emulsified in 60 mls. of a 2% solution of sodium-dioctyl-sulpho-succinate at 60° C. under vigorous stirring.

The emulsion is then mixed with the solution of polyvinyl alcohol and 6.25 mls. of 10% by weight sulphuric acid are stirred in gradually over one hour. Stirring is contnued for another 4 hours at 60° C. to complete the precipitation of the polyvinyl 5-bromo-1-naphthol, which is obtained as a very fine powder.

Example 18

20 grams of a partial polyvinyl alcohol containing 20% of residual acetyl groups are dissolved in 180 mls. of water, 20 grams of 37.5% by weight formaldehyde and 8 mls. of 10% by weight sulphuric acid are added and the mixture is heated to 70° C., reacted at that temperature for 2 hours under stirring and cooled. The still water-soluble intermediate product is then diluted with 280 mls. of water, 8.4 mls. of 10% sulphuric acid are added and 11.2 grams of benzaldehyde previously emulsified in 195 mls. of a 2% solution of sodium dioctyl-sulpho-succinate are stirred in. The mixture is allowed to react under vigorous stirring at 20° C. for 4 hours, after which the product is filtered, washed and dried. The product is a very fine powder in which about 20% of the hydroxyl groups are substituted by acetyl, about 22% by methylene and about 28% by benzylidene groups.

If in the first part of the above preparation, 6.5 grams of n-butyraldehyde is used instead of formaldehyde and the mixture is heated to 50° C., the reaction takes place very rapidly and is already completed after 5 minutes. The resulting gel redissolves on cooling and is then reacted with benzaldehyde as described above. In the resulting product about 20% of the hydroxyl groups are substituted by acetyl, about 21% by butylidene and about 34% by benzylidene groups.

Example 19

14 grams of polyvinyl alcohol containing 5% of residual acetyl groups are dissolved in 126 mls. of water, the solution is heated to 70° C. and 10 grams of stearaldehyde are dispersed in it. 6 mls. of 10% by weight sulphuric acid are then added and the mixture is reacted under stirring for one hour at 70° C. The resulting intermediate product is then diluted with 185 mls. of water, and further reacted with benzaldehyde as described in the preceding example. The product is a partial polyvinyl stearalbenzal, in the form of a very fine white powder.

Example 20

10 grams of the partial polyvinyl alcohol used in Example 18 is dissolved in 210 mls. of water and 7.65 mls. of 10% by weight sulphuric acid are added to the solution. An emulsion of 4 grams of n-heptaldehyde and 10 grams of benzaldehyde in 90 mls. of a 2% solution of sodium dioctyl-sulpho-succinate is then stirred in and the mixture is heated under vigorous stirring for 2 hours at 50° C. The resulting partial polyvinyl heptal-benzal precipitates as a very fine powder.

Instead of n-heptaldehyde, other aliphatic aldehydes such as paraldehyde or butyraldehyde may be used simultaneously with the aromatic aldehyde to produce mixed polyvinyl benzals in finely divided form.

Example 21

100 grams of the dried product formed in Example 1 are dispersed in a solution of 3 grams Rhodamine B (Color Index No. 749) in 1000 mls. of water. The temperature is raised to 95° C. and maintained there for 1 hour, the mixture being continually stirred. The product, after filtering and drying consists of a bright bluish-red powder of very good fastness to light.

Example 22

100 grams of the product of Example 3 are dispersed in a solution of 3 grams Brilliant Green Y (Color Index No. 662) in 100 mls. of water. The temperature is raised to 70° C. and maintained there for 1 hour with continual stirring. The product, after filtering, washing and drying consists of a bright green powder of very good fastness to light.

Example 23

250 grams of a partial polyvinyl alcohol, in which 15% of the hydroxy groups are replaced by acetyl groups and 30% by ethylidene groups and which has been obtained by the partial hydrolysis of a polyvinyl acetal in which 30% of the hydroxy groups have been replaced by acetyl groups and 70% by ethylidene groups are dissolved in 4850 mls. of water containing 10 grams of Rhodamine B (Color Index No. 749) and 562 mls. of a 2% by weight solution of sodium dioctyl-sulpho-succinate added. 125 grams of benzaldehyde are emulsified in the mixture by rapid stirring, 100 mls. of 10% by weight sulphuric acid added and the while stirred at a speed of 1100 revolutions per minute for 4 hours at a temperature of 20° C. The product, after filtering, washing and drying consists of a bright bluish-red powder of very good fastness to light.

Example 24

The preparation is carried out as in Example 23, but the Rhodamine B is omitted; in this case a white powder is obtained. 100 grams of this product are suspended in 1000 mls. of a 0.3% by weight aqueous dispersion of 1:4 di-amino-anthraquinone, the temperature raised to 70° C. and maintained there for 1 hour with continual stirring. The product, after filtering, washing and drying consists of a bright red-violet powder.

Example 25

100 grams of the product prepared according to Example 4 are suspended in a solution of 3 grams Chlorazol Fast Helio 2RK (Color Index No. 319 suppl.) in 1000 mls. of water the temperature raised to 70° C. and maintained there for 1 hour with continual stirring. The product, after filtering, washing and drying consists of a reddish-violet powder.

Example 26

100 grams of the product prepared according to Example 5 are suspended in a dispersion of 3 grams Sudan G (Color Index No. 23) in 1000 mls. of water, the temperature raised to 50° C. and maintained there for 1 hour with continual stirring. The product, after filtering, washing and drying consists of an orange-yellow powder.

Example 27

10 g. of Indanthrene Brilliant Violet 4R 30% paste (Rowe, 1. c. page 90) are mixed first with 45 ml. of a 0.4% solution of sodium oleyl sulphate, then with 40 ml. of a 33% solution of sodium hydroxide and about 400 ml. of water are added. The mixture is heated to 60° C. and 5 g. of sodium hydrosulphite are dissolved in it. When reduction is complete, the solution is made up to 600 ml. with water.

30 g. of a partial polyvinyl benzal prepared as described in Example 2 and possessing about 50% of unreacted hydroxyl groups are carefully pasted with about 45 ml. of the solution of leuco-vat dyestuff, the remainder of the solution is gradually added, the liquor is quickly heated to 60° C. and then gradually over a period of 30 min. to 90° C. and kept at that temperature for a further 30 minutes under continuous stirring. The dyed polyvinyl benzal is then filtered off, washed twice in succession with 15 ml. of cold water on the filter, then transferred into a shallow vessel with as large a surface as possible exposed to the atmosphere and left for about 16 hours. The oxidation is then completed by stirring the powder with 210 mls. of a 5% solution of acetic acid and allowing to stand for another 15 minutes. The pigment is then filtered off and washed free from acid. It is then further washed at 95° C. with one liter of a solution containing 2 grams of soap, 1 gram of sodium carbonate and 1 gram of sodium percarbonate for 30 minutes, filtered off, washed free from sodium carbonate and dried.

The product is a deep purple powder of outstanding brightness and of excellent fastness to light. The original dyestuff in powder form is a dull purplish black, devoid of any value as a pigment.

Example 28

18 g. of Hydron Pink FF powder (Rowe, 1. c. p. 73) are mixed first with 45 ml. of a 10% solution of sodium ricinoleate, then with 60 ml. of a 33% sodium hydroxide solution and about 400 ml. of water are added. The mixture is heated to 80° C. and 18 g. of sodium hydrosulphate are dissolved in it. When reduction is complete, the solution is made up with water to 600 ml.

30 grams of a partial polyvinyl benzal prepared as described in Example 2 and in which about 60% of the alcoholic hydroxyl groups are free, is pasted up and dyed as described in Example 27. Under these conditions, about 85% of the dyestuff in solution is taken up by the partial polyvinyl benzal.

The liquor is then cooled to 70° C. and kept at that temperature for 15 minutes before filtering. The subsequent procedure is as described in Example 27.

The product is a red powder of a bluer and considerably brighter shade than the original dyestuff. It possesses excellent fastness to light.

Example 29

45 g. of Caledon Jade Green XN 60% paste (Col. Ind. No. 1101) are mixed first with 45 ml. of a 10% solution of sodium sulphoricinoleate, then with 40 ml. of a 33% solution of sodium hydroxide and about 400 ml. of water are added. The mixture is then heated to 50° C. and 30 g. of sodium hydrosulphite are dissolved in it. When reduction is complete the solution is made up with water to 600 ml.

30 grams of a partial polyvinyl alcohol prepared as described in Example 2, and in which about 40% of the alcoholic hydroxyl groups are free, are carefully pasted with about 50 ml. of the solution of the leuco vat dyestuff, the remainder of the solution is stirred into the paste and the dyeing is carried out at 90° C. for 30 minutes under stirring.

The liquor is then cooled to 70° C. and maintained at that temperature for 15 minutes before filtering. The subsequent procedure is the same as for Example 27. The product is a green powder of outsanding brightness and excellent fastness to light.

Example 30

28.8 grams of 2-naphthol are dissolved in a mixture of 63 ml. of a 33% solution of sodium hydroxide, 15 ml. of a 25% solution of sodium ricinoleate and 320 ml. of water and the whole then made up to 500 ml. 25 grams of a partial polyvinyl benzal containing about 60% of free hydroxyl groups are pasted with 80 ml. of the above solution and the remainder of the solution is stirred in gradually. The mixture is then heated to 60° C. and kept at this temperature for 30 minutes with stirring after which the polyvinyl benzal is filtered, washed with water and pressed.

9 grams of 4-nitro-2-methoxy-aniline are diazotized in the usual manner with sodium nitrite and hydrochloric acid and after adding sufficient sodium acetate to neutralize the excess of hydrochloric acid the solution is made up to 300 ml. of cold water. The polyvinyl benzal which has been treated as described in the first part of this example, is now pasted with 80 ml. of the diazonium solution, the remainder of the solution is added gradually and the mixture stirred for about 2 hours. The dyed polyvinyl benzal is then filtered, washed free from diazonium solution with cold water, treated with a solution of 2 grams of soap and 0.5 gram of sodium carbonate per liter for 10 minutes at 95° C., again filtered, washed free of alkali and dried. The product is a bluish red pigment of good fastness to light.

Example 31

26.3 grams of 2-hydroxy-3-naphthoic acid anilide are pasted with 15 ml. of a 25% solution of sodium sulphoricinoleate; 45 ml. of a 33% solution of sodium hydroxide and about 400 ml. of hot water are added and after the naphthol has dissolved, the solution is made up with water to 500 ml. 25 grams of a partial polyvinyl benzal containing about 50% of free hydroxyl groups are pasted with 80 ml. of the above solution and the remainder is added gradually. The mixture is then heated to 90° C. and kept at this temperature for 30 minutes with stirring, after which the temperature is allowed to drop to 50° C., when the polyvinyl benzal is filtered, washed with water and hydro-extracted. It is then treated in a diazonium solution obtained in the usual manner from 2.5-diethoxy-4-benzoyl aminoaniline.

The resulting product is a pigment colored blue, which is very much brighter than the azo compound obtained directly in aqueous solution from these components and this advantage is rendered particularly evident when the latter is mixed with some white pigment so as to make it more comparable in depth of shade with the dyed polyvinyl benzal.

If diazotized 2-methoxy-5-methyl-4-benzoyl-aminoaniline, a bright violet pigment is obtained which shows the same advantage of much superior brightness against the azo compound obtained directly in aqueous solution from these components.

Example 32

28.5 grams of di-aceto acetic acid-o-tolidide are pasted with 15 ml. of a 25% solution of sodium sulphoricinoleate and 63 ml. of a 33% solution of sodium hydroxide, about 400 ml. of hot water are added and the resulting solution is made up to 500 ml. 25 grams of the partial polyvinyl benzal used in the preceding example are pasted with 80 ml. of the above solution, the remainder being added gradually and then treated for 30 minutes at 90° C. under stirring. The liquor is allowed to cool to 70° C. The treated powder is then filtered, washed with cold water and pressed. It is then further treated with a diazonium solution prepared in known manner from 2-methoxy-aniline. The product is a lemon yellow pigment of very good fastness to light.

Example 33

35 grams of an equimolecular mixture of 2-hydroxy-3-naphthoic acid-anilide and the sodium derivative of 2.5-dichlorobenzene diazonium hydroxide are pasted with 20 ml. of a 25% solution of sodium sulphoricinoleate and 63 ml. of a 33% solution of sodium hydroxide; about 400 ml. of hot water are added and after the product has dissolved, the solution is made up to 500 ml.; 25 grams of the partial polyvinyl benzal used in the preceding examples are pasted with 80 ml. of the solution and the remainder is stirred in gradually. The mixture is then treated for 30 minutes at 60° C. under stirring. The treated polyvinyl benzal is then filtered, washed with cold water, pressed and then treated with an excess of hot 10% formic acid under stirring. After 10 minutes the dyed polyvinyl benzal is filtered, washed well with water, treated with hot alkaline soap solution as in the previous examples, filtered, pressed and dried. The product is a bright scarlet pigment of very good fastness to light.

Example 34

28.5 grams of 2,2'-dihydroxy 5,5'-dimethyl-diphenylmethane are pasted with 56 mls. of a 33% solution of sodium hydroxide about 350 mls. of hot water are added and the resulting solution made up to 500 mls. 25 grams of a finely divided partial polyvinyl benzal in which the percentage of hydroxyl groups replaced by benzal groups does not exceed 45% are pasted with 80 mls. of the above solution, the remainder being then added gradually and then treated for 30 minutes at 90° C. with stirring. The liquor is then allowed to cool with continued stirring to 50° C., the dyed powder is filtered off, washed with cold water and drained. It is then treated with a solution of diazotized 2,5-dichloraniline prepared in the usual manner. The subsequent procedure is the same as in Example 30. The product is an orange pigment of very good fastness to light.

Example 35

A partial polyvinyl benzal prepared as described in Example 1, is molded in a hot press at a temperature of 110° C. and a pressure of 2 tons/sq. in., for 10 minutes. The result is a pale yellow, transparent, fairly hard but resilient molding.

Example 36

A red partial polyvinyl benzal pigment prepared as described in Example 21, is completely mixed with an equal quantity of a green partial polyvinyl benzal pigment prepared as described in Example 22 and the mixture is molded as in Example 35. The result is a partly opaque molding showing a red, green and black marbled effect.

Example 37

An intimate mixture of equal parts by weight of a partial polyvinyl benzal prepared as described in Example 1 and a fine poly-methyl-methacrylate resin powder is molded under the conditions described in Example 35. The result is a pale yellow, translucent product, which is harder than the poly-methyl-methacrylate resin itself.

Example 38

An intimate mixture of equal parts by weight of a partial polyvinyl benzal prepared as described in Example 1 and monomethylol urea, to which has been added 0.5% by weight of benzoic acid is molded at a temperature of 120° C. and a pressure of 3 tons/sq. in. for 10 minutes. The result is a pale yellow, translucent product which is harder than the product obtained in Example 35.

Example 39

50 parts by weight of a partial polyvinyl benzal prepared as described in Example 1, 25 parts by weight of triacetine and 25 parts by weight of benzyl alcohol are intimately mixed and then molded at a temperature of 95° C. and a pressure of 3 tons/sq. in., for 2 minutes. The result is a flexible transparent rubber-like body of good elastic recovery.

Example 40

25 grams of a finely divided partial polyvinyl benzal are dyed with 500 mls. of a solution containing 0.57 grams of 2-hydroxy-3-naphthoic acid-p-anisidide, 15 grams of sodium hydroxide and 3.75 grams of sodium sulphoricinoleate as described in previous examples. The dyed powder is then treated with a solution of diazotized 5-nitro-2-amino-toluene and the subsequent procedure is the same as in Example 30. The resulting pale pink powder is molded in a press at 140° C. and a pressure of 2 tons per square inch. The resulting molding is deep red.

While we have described what we consider to be the best embodiments of our process it is evident, of course, that various modifications can be made in the specific procedures which have been described without departing from the purview of this invention. As indicated previously, in the making of our mixed aliphatic-aromatic acetals it is possible to condense the polyvinyl alcohol with the aliphatic aldehyde first to produce a partial polyvinyl alcohol which must still have at least about 35 per cent of the theoretically possible hydroxyl groups free and which must be water soluble to at least about one per cent by weight, and then to condense this partial polyvinyl alcohol with the aromatic aldehyde, but it is equally possible to condense the polyvinyl alcohol with a mixture of aliphatic and aromatic aldehydes in finely dispersed state in a one-step procedure. The mixed aliphatic-aromatic acetal products are not necessarily better than those produced from aromatic aldehydes alone but the former may be less expensive owing to the fact that smaller proportions of aromatic aldehyde are needed in the production of the mixed acetals.

It is believed evident from the above description that a wide selection of dyeing techniques can be used in the production of our pigments. It would be impossible within the scope of a patent specification to describe all of the different procedures and dyes which can be used. But it is believed that we have described a sufficient number of specific procedures to enable anyone skilled in the art to dye our polyvinyl aromatic acetals satisfactorily with any of the dyes falling within the scope of the following claims which possess the described common properties which seem to be essential for our purposes.

The pigments which are included in the present invention may be used for all purposes for which colored pigments are normally used, such as the preparation of colored paints, artist's colors, lacquers, varnishes, printing colors and coating compositions for the decoration of fabrics or paper, colored plastics and the like. In addition, these pigments can be used with or without the addition of other thermoplastic or thermosetting resins or resin forming compositions, fillers and plasticizers for the preparation of molded articles by the application of heat and pressure. The polyvinyl acetal pigments may be mixed with known mineral or organic white or colored pigments; for instance, pale shades may be obtained from fully dyed polyvinyl pigments by admixture of a white mineral pigment, such as titanium dioxide. Pale shades may also be obtained directly by dyeing the polyvinyl acetal with a (correspondingly) smaller amount of dyestuff; undyed polyvinyl acetal in finely dispersed form may be used as a white pigment. Mixed shades may be obtained by mixing a polyvinyl pigment with another polyvinyl pigment or with a pigment of a different type, or such mixed shades may be produced directly by dyeing the finely dispersed polyvinyl acetal with two or more dyestuffs which have an affinity for it. Marbled effects may be obtained by incomplete mixing of a polyvinyl acetal pigment with another polyvinyl acetal pigment and/or undyed polyvinyl acetal, followed by molding by heat and pressure. Applicants hereby disclaim processes which involve preparation of the finely-divided polyvinyl aromatic acetals, which are covered by their claims, followed by the dyeing of these acetals with vat dyestuffs, as described and claimed in No. 2,534,136, and followed by the dyeing of these acetals with azo dyes, as described and claimed in Ser. No. 50,252. Other modifications of our invention which fall within the scope of the following claims will be immediately evident to those skilled in this art.

What we claim is:

1. In the manufacture of finely-divided polyvinyl aromatic acetals, the process which comprises mixing under agitating conditions a dilute aqueous polyvinyl alcohol solution, containing dissolved therein from about 1 to 20 per cent of a polyvinyl alcohol in which at least about 35 per cent of the theoretically possible hydroxyl groups are unsubstituted, with an aromatic aldehyde of the benzene and naphthalene series in the proportions of at least about 0.1 mole of aldehyde to 1 mole of polyvinyl alcohol, causing the aldehyde to condense with the polyvinyl alcohol in an aqueous reaction medium in which the acetal reaction product is so insoluble that it will precipitate as fast as it is formed, in the presence of an acetalizing catalyst and while the aldehyde is in a highly dispersed state, at temperatures above the freezing point of the solution but at least about 20° C. below the softening range of the resulting polyvinyl aromatic acetal, and recovering the finely divided solid polyvinyl aromatic acetal from the reaction mixture.

2. The process of claim 1 wherein the proportions of aromatic aldehyde and polyvinyl alcohol are controlled in the reaction medium so that at least about 20 per cent of the theoretically possible hydroxyl groups of the polyvinyl alcohol in the acetal formed in the process are left unsubstituted, whereby the polyvinyl aromatic acetals obtained are capable of being dyed.

3. The process of claim 1 wherein the molecular ratio of the aldehyde to the polyvinyl alcohol is controlled within the limits of 0.1:1 to 0.8:1.

4. The process of claim 1 wherein the temperature during the reaction is maintained within the range of from about 1° to 80° C.

5. The process of claim 1 wherein an emulsifying agent is present in the polyvinyl alcohol solution and wherein the aromatic aldehyde is emulsified in the solution as it is added thereto.

6. The process of claim 1 wherein the aromatic aldehyde is added to the polyvinyl alcohol solution in the form of an aqueous emulsion.

7. The process of claim 1 wherein the aromatic aldehyde is a solid at the reaction temperatures and is emulsified by adding a solution thereof in a liquid aldehyde to the polyvinyl alcohol solution, thereby producing a mixed acetal.

8. The process of claim 1 wherein the polyvinyl alcohol is a partially hydrolyzed polyvinyl ester alcohol but contains no more than about 20 per cent of the original ester groups of the ester from which it was derived.

9. The process of claim 1 wherein the polyvinyl alcohol contains aliphatic acetal groups but not more than that corresponding to about 50 per cent of the theoretically possible hydroxyl groups in the alcohol.

10. The process of claim 1 wherein the polyvinyl alcohol is a substantially completely hydrolyzed polyvinyl ester containing no more than about 5 per cent of the original ester groups.

11. In the manufacture of polyvinyl aromatic acetals capable of being dyed to produce organic pigments, the process which comprises mixing a dilute aqueous polyvinyl alcohol solution, containing from about 1 to 20 per cent by weight of a polyvinyl alcohol in which at least about 35 per cent of the theoretically possible hydroxyl groups are unsubstituted, with an aromatic aldehyde of the benzene and naphthalene series in molecular proportions within the range of from about 0.1 to 0.8 mole of aldehyde to 1 mole of polyvinyl alcohol but so that in the resulting product at least about 20 per cent of the theoretically possible hydroxyl groups of the polyvinyl alcohol residue are left free, causing the aldehyde to condense with the polyvinyl alcohol in an aqueous reaction medium in which the acetal reaction product is so insoluble that it will precipitate as fast as it is formed, in the presence of an acetalizing catalyst while in a highly dispersed state while agitating and maintaining the temperature of the reaction mixture within the range of from about 1° to 80° C., thereby producing a finely-divided solid polyvinyl aromatic acetal.

12. The process of claim 11 wherein the polyvinyl alcohol contains no more than about 20 per cent of aliphatic ester groups and no more than about 50 per cent of aliphatic acetal groups, expressed in terms of the theoretically possible hydroxyl groups in the polyvinyl alcohol.

13. As a new product, a polyvinyl aromatic acetal capable of being dyed with organic dyestuffs containing at least one substituent group selected from the class consisting of amino groups, phenolic hydroxyl groups and enolic hydroxyl groups, which acetal contains aromatic acetal groups and free hydroxyl groups and which may contain low-molecular aliphatic ester groups and aliphatic acetal groups falling within the ranges indicated in the following table and as expressed in terms of the theoretically possibly hydroxyl groups of the polyvinyl residue in said acetal:

| Ester Groups | Aromatic Acetal | Aliphatic Acetal | Total Acetal | Free Hydroxyl |
| --- | --- | --- | --- | --- |
| Percent | Percent | Percent | Percent | Percent |
| Up to 5 | 30–70 | 0 | 30–70 | 65–25 |
| 20 | 20–60 | 0 | 20–60 | 60–20 |
| Up to 5 | 20–70 | 50–5 | 75–25 | 70–20 |
| 20 | 15–60 | 30–5 | 60–20 | 60–20 | said polyvinyl aromatic acetal having an average particle size within the range of from about 0.5 to 5 microns with substantially no particles over 20 microns, having softening points within the range of from about 100° to 135° C., being insoluble in water, ether, petroleum fractions, and aromatic hydrocarbons but freely soluble in benzyl alcohol, tetrahydrofurfuryl alcohol, dioxane, m-cresol, aniline, m-toluidine, p-xylidine and cyclohexylamine, their solubility in organic solvents increasing with increase in acetal group content, having a high affinity for organic dyestuffs of the type stated and capable of being molded under the action of heat and pressure.

14. A dyed polyvinyl aromatic acetal suitable for use as a pigment or molding powder, which acetal contains aromatic acetal groups and free hydroxyl groups and which may contain low-molecular aliphatic ester groups and aliphatic acetal groups falling within the ranges indicated in the following table and as expressed in terms of the theoretically possible hydroxyl groups of the polyvinyl residue in said acetal:

| Ester Groups | Aromatic Acetal | Aliphatic Acetal | Total Acetal | Free Hydroxyl |
|---|---|---|---|---|
| *Percent* | *Percent* | *Percent* | *Percent* | *Percent* |
| Up to 5 | 30-70 | 0 | 30-70 | 65-25 |
| 20 | 20-60 | 0 | 20-60 | 60-20 |
| Up to 5 | 20-70 | 50-5 | 75-25 | 70-20 |
| 20 | 15-60 | 30-5 | 60-20 | 60-20 | said acetal having an average particle size within the range of from about 0.5 to 5 microns with substantially none over 20 microns, having softening points within the range of from about 100° to 135° C., being insoluble in water, ether, petroleum fractions and aromatic hydrocarbons but freely soluble in benzyl alcohol, tetrahydrofurfuryl alcohol, dioxane, m-cresol, aniline, m-toluidine, p-xylidine and cyclohexylamine, being readily moldable under the action of heat and pressure and dyed with an organic dye, with the exception of vat dyestuffs and azo dyes, having at least one substituent group in the molecule selected from the class consisting of amino groups, phenolic hydroxyl groups and enolic hydroxyl groups and having a solubility in water ranging from about 0.01 to 1.5 per cent by weight, the color being exceptionally bright and substantially fast to light.

LOUIS AMÉDÉE LANTZ.
ARTHUR SCHOFIELD.

References Cited in the file of this patent
UNITED STATES PATENTS

| Number | Name | Date |
|---|---|---|
| 2,269,216 | McNally | Jan. 6, 1942 |
| 2,534,136 | Lantz et al. | Dec. 12, 1950 |